United States Patent [19]

Fillmore et al.

[11] Patent Number: 5,184,978
[45] Date of Patent: Feb. 9, 1993

[54] TELESCOPIC TRIPLAN UNIVERSAL JOINT

[75] Inventors: Francis L. Fillmore, Birmingham; Michael J. Schmidt, Grosse Pointe Park, both of Mich.

[73] Assignee: GKN Automotive, Inc., Auburn Hills, Mich.

[21] Appl. No.: 744,672

[22] Filed: Aug. 9, 1991

Related U.S. Application Data

[63] Continuation of Ser. No. 509,147, Apr. 16, 1990, abandoned.

[51] Int. Cl.$^5$ .............................................. F16D 3/26
[52] U.S. Cl. ................................ 464/111; 464/132; 464/167
[58] Field of Search .............. 464/111, 120, 167, 905, 464/132, 156

[56] References Cited

U.S. PATENT DOCUMENTS

| | | | |
|---|---|---|---|
| 3,584,474 | 6/1971 | Church | 464/156 |
| 4,490,126 | 12/1984 | Orain | 464/111 |
| 4,512,750 | 4/1985 | Orain | 464/111 |
| 4,619,628 | 10/1986 | Orian | 464/111 |
| 4,684,356 | 8/1987 | Kimata et al. | 464/167 X |
| 4,741,723 | 5/1988 | Orain | 464/120 X |
| 4,778,434 | 10/1988 | Taniyama et al. | 464/111 |
| 4,828,534 | 5/1989 | Orain | 464/111 |

*Primary Examiner*—Daniel P. Stodola
*Assistant Examiner*—Tony A. Gayoso
*Attorney, Agent, or Firm*—Harness, Dickey & Pierce

[57] ABSTRACT

A telescopic triplan universal joint having an inner joint member and an outer joint member. The outer joint member has three longitudinal chambers equally spaced about an axis of rotation. Each chamber has a pair of face-to-face longitudinal guideways. The inner joint member has three trunnions which radially extend into the three longitudinal chambers. Each longitudinal guideway is rollingly engaged by a planar roller bearing which is movable therealong. A movable race is disposed between each planar roller bearing and the trunnion extending into its associated chamber. The movable race has a flat surface engaging the planar roller bearing, a concave trunnion seat mating with the spherical surface of the trunnion, and a pair of transverse stop abutments which limit the longitudinal displacement of the planar roller bearing along the guideways relative to the movable race.

10 Claims, 2 Drawing Sheets

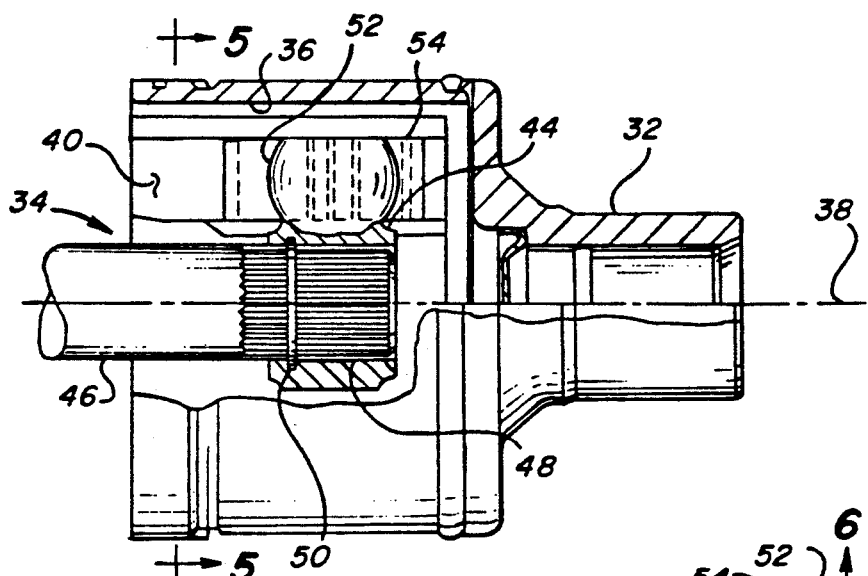
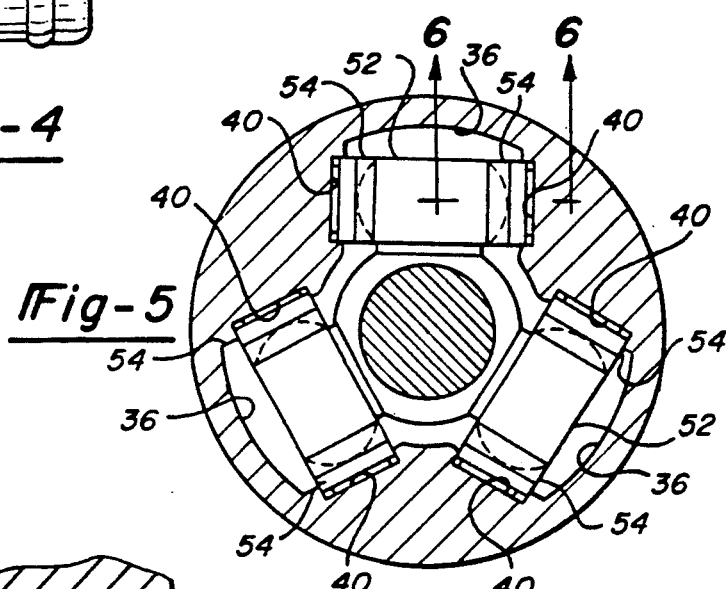
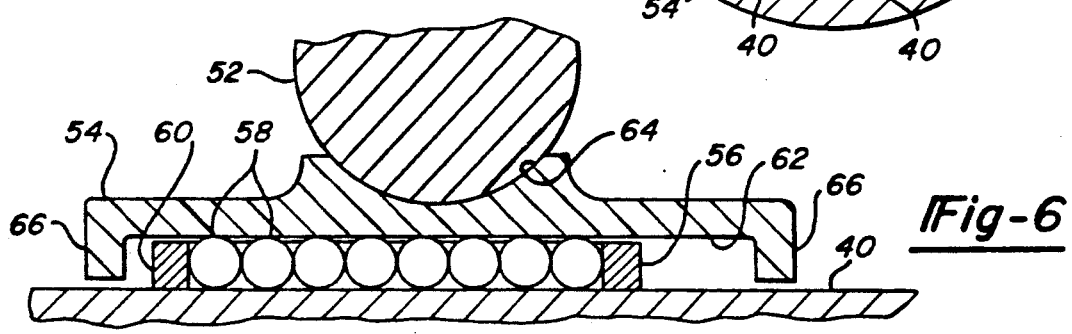
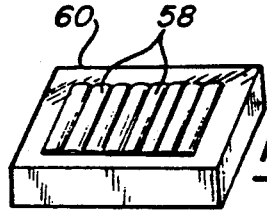
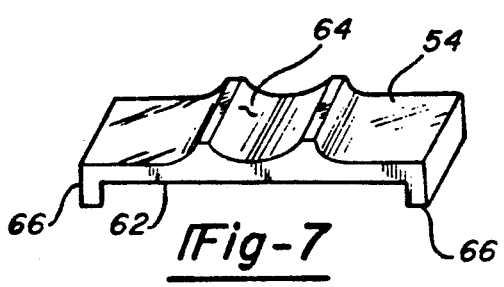

TELESCOPIC TRIPLAN UNIVERSAL JOINT

This is a continuation of U.S. Pat. application Ser. No. 07/509,147, filed Apr. 16, 1990, now abandoned.

BACKGROUND OF THE INVENTION

1. Field of the Invention

The invention is related to the field of universal joints and in particular to a telescopic triplan universal joint.

2. Description of the Prior Art

Telescopic triplan universal joints such as taught by Orain in U.S. Pat. Nos. 4,490,126; 4,619,628; and 4,828,534 have an outer joint member 10 and an inner joint member 12 as shown in FIGS. 1 and 2. The outer joint member 10 normally has three symmetrically disposed chambers, each chamber having a pair of opposing side walls. Each side wall in each chamber has a flat longitudinal guideway 14 which runs parallel to the axis of rotation of the outer joint member. The longitudinal guideways 14 are spatially separated and parallel to each other.

The inner joint member consists of a spider member 16 which may be connected to a shaft 18. The spider member 16 has three equally spaced radially extending trunnions 20. Each trunnion 20 extends into one of the chambers in the space between a pair of longitudinal guideways 14 as shown in FIG. 2.

Disposed between each trunnion 20 and the adjacent longitudinal guideway 14 is a button 22 and a planar roller bearing 24. As shown more clearly in FIG. 3, the button 22 has a concave surface which mates with the spherical surface of the trunnion 20 and a flat surface which engages the surface of the planar roller bearing 24 on the side opposite the longitudinal guideway 14. The planar roller bearing 24 has a rectangularly shaped cage 26 in which are journaled a plurality of needle bearings 28. The cage 26 also has a pair of lateral guides which are received in grooves provided on the opposite side of the longitudinal guideways 14 and a pair of transverse lips or stops 30 provided at its opposite ends to maintain the button 22 in contact with the surface of the planar roller bearing 24. The transverse stops 30 are to prevent the button 22 from being disengaged from the planar roller bearing 24 when the inner joint member 12 is displaced at an angle relative to the outer joint member 10. In the universal joint taught by Orain in U.S. Pat. No. 4,619,628 a spring (not shown) is used between the stops on the planar roller bearing and the button to help maintain the center of the planar roller bearing under the button.

The problem with these structures is that under high torque loads, the friction between the planar roller bearings and the longitudinal guideways 14 increases to the point where the lateral forces of the button acting on the stops 30 is sufficient to break the stops off causing a failure of the universal joint. The present invention is a solution to this problem.

SUMMARY OF THE INVENTION

The invention is a telescopic triplan universal joint having an outer joint member and an inner joint member. The outer joint member has three symmetrically disposed chambers extending longitudinally therein about an axis of rotation of the outer joint member. Each symmetrically disposed chamber has a pair of spatially separated opposing side walls and each side wall has a longitudinal guideway. The inner joint member has three equally spaced radially extending trunnions which individually extend into one of the three symmetrically disposed chambers and extend between the longitudinal guideways. Each of the trunnions has a spherical surface facing each of the guideways. Each of the guideways is engaged by a planar roller bearing which is longitudinally movable therealong. A movable race is disposed between each planar roller bearing and the adjacent trunnion. The movable race has a flat surface engaging the planar roller bearing on the side opposite the guideway and a concave trunnion seat pivotally engaging the spherical surface of the trunnion. The movable race also has a transverse stop abutment provided at each end which extends from the flat surface engaging the planar roller bearing towards the guideway to limit the longitudinal displacement of the planar roller bearing therebetween.

One object of the invention is to provide a reliable means for maintaining the position of the planar roller bearing in a triplan universal joint.

Another object of the invention is to provide the stops for the planar roller bearing on the movable race.

Still another object of the invention is to permit limited unrestricted movement of the planar roller bearing by separating the stops provided on the movable race a distance greater than the length of the planar roller bearing.

These and other objects, features, and advantages of the invention will become more apparent from a reading of the specification in conjunction with the drawings.

BRIEF DESCRIPTION OF THE DRAWINGS

FIG. 4 is a partial cross-sectional side view of a triplan universal joint incorporating the invention;

FIG. 5 is a cross-sectioned end view of the triplan universal joint shown in FIG. 4 taken along lines 5—5;

FIG. 6 is a partial cross-sectional side view showing the details of the movable race taken along lines 6—6 of FIG. 5;

FIG. 7 is a perspective view of the movable race; and

FIG. 8 is a perspective view of a planar roller bearing.

DETAILED DESCRIPTION OF THE PREFERRED EMBODIMENT

Figure 1:
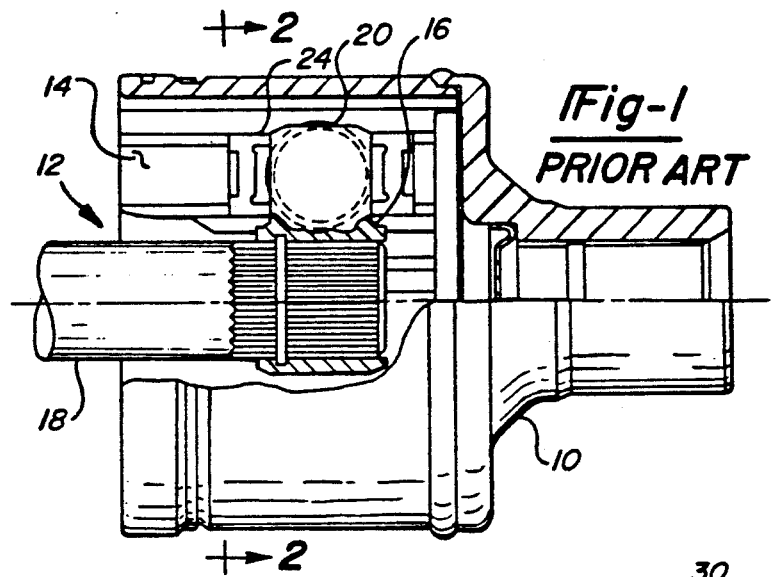
FIG. 1 is a partial cross-sectional side view of the prior art triplan universal joint.
Figure 2:
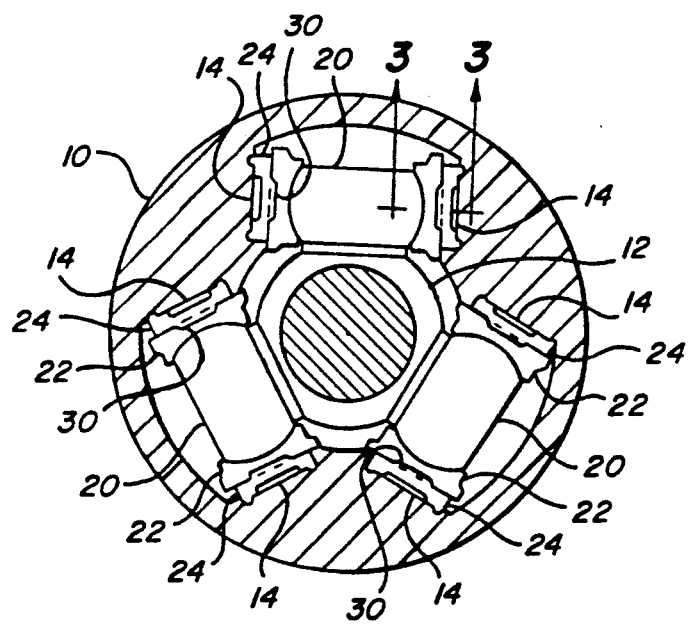
FIG. 2 is a cross-sectional end view of a prior art triplan universal joint.

FIG. 4 is a partial cross-sectional view of a telescopic triplan universal joint embodying the invention. The universal joint has an outer joint member 32 and an inner joint member 34. The outer joint member 32 has three equally spaced longitudinal chambers 36 generally parallel to the axis of rotation 38 of the outer joint member. Each longitudinal chamber 36 has a pair of face-to-face spatially separated side walls. In each of these side walls a recessed longitudinal guideway 40 is formed which extends parallel to the axis of rotation 38. Preferably the longitudinal guideways have flat surfaces which are parallel to the surface of the longitudinal guideway provided on the opposite wall.

The inner joint member 34 has a spider member 44. The spider member 44 may be made integral with a shaft 46 or the spider member 44 and the shaft 46 may be separate elements rotatably joined to each other by mating splines 48 and axially locked by a lock washer 50 received in annular grooves provided in both the shaft and the spider member as shown in FIG. 4. The spider member 44 has three equally spaced radially extending trunnions 52, one of the trunnions 52 extending into each chamber 36 as shown in FIG. 5. At least a portion of the external surface of each trunnion 52 has a spherical shape as shall be explained later herein. A movable race 54 and a planar roller bearing 56 are disposed between each trunnion 52 and the adjacent recessed guideways 40 of the associated chamber 36.

As shown more clearly in FIG. 6, the planar roller bearing 56 has a plurality of pin bearings 58 journaled in a rectangular cage member 60. The pin bearings 58 rollingly engage the flat surface of the longitudinal guideway 40. The movable race 54 has a flat surface 62 which rollingly engages the pin bearings 58 on the side opposite the guideway 40. A transverse cylindrical trunnion seat 64 is disposed on the side of the movable race opposite the flat surface 62. The movable race 54 also has a pair of stop abutments 66 disposed at its opposite ends which extend into the recessed guideway 40 on either side of the planar roller bearing 56. The curvature of the cylindrical trunnion seat 64 mates with the spherical external surface of the trunnion 52. The cylindrical trunnion seat 64 permits the movable race to remain in the recessed longitudinal guideways when the position of the spherical surface of the trunnion which contacts the cylindrical trunnion seat 64 is radially displaced as a result of the inner joint member 34 being disposed at an angle relative to the outer joint member 32.

The distance between the stop abutments 66 is greater than the length of the planar roller bearing 56 so that when the angle between the inner and outer joint members is less than a predetermined angle, the pin bearing assembly will not be engaged by the stop abutment 66 as the movable race 54 oscillates with the rotation of the universal joint. However, the stop abutment 66 will engage and displace the planar roller bearing 56 along the longitudinal guideway 40 when the relative axial position of the inner joint member to the outer joint member is changed or the angle between the inner joint member and the outer joint member exceeds a predetermined angle.

The details of the planar roller bearing 56 are shown in FIG. 8. As previously indicated, a plurality of pin bearings 58 are journaled in a rectangular cage member 60. The width of the cage member 60 is selected so that it is slidably received in the recessed longitudinal guideways 40.

It is not necessary that the entire external surface of the trunnion 52 have a spherical surface as shown in FIG. 4. As is known in the art, only the external surfaces of the trunnion 52 which engage the cylindrical trunnion seat 64 of the movable race needs to be spherically shaped. The portion of the external surfaces of the trunnion which do not engage the cylindrical trunnion seat 64 may be flat as shown in FIG. 1 or have any other shape known in the art.

Figure 3:
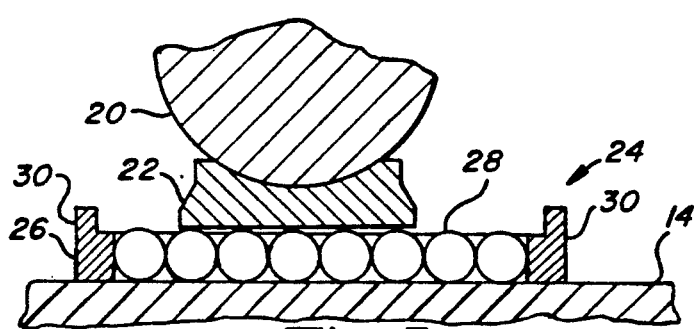
FIG. 3 is a partial cross-sectional side view showing the relationship between the planar roller bearing and the button.

The details of the movable race 54 are more clearly shown in the perspective view shown in FIG. 7. The advantages of placing the stop abutments 66 on the movable race are that the loaded cross-sectional area of the stop abutments 66 may be significantly increased over the structures taught by the prior art, as illustrated in FIG. 3. Further, a higher structural steel may be used in the fabrication of the movable race, and the movable race may be heat treated to optimize its strength which was not possible when the stops were formed on the cage. As a result, a significant improvement in the durability of the triplan universal joint has been obtained.

It will be apparent that the invention is not to be limited to the specific structure illustrated in the drawings and discussed above. It is recognized that others skilled in the art may modify or make changes within the scope of the invention as disclosed herein and set forth in the appended claims.

What is claimed is:
1. A telescopic triplan universal joint comprising:
an outer joint member having at least three symmetrically disposed chambers extending longitudinally therein, each chamber having a pair of spatially separated opposing longitudinal walls, each wall of said pair of opposing longitudinal walls of each chamber having a longitudinal guideway;
an inner joint member disposed within said outer joint member, said inner joint member having at least three radially extending trunnions, each radially extending trunnion extending into a respective one chamber of said at least three chambers between said longitudinal guideways provided therein, each of said trunnions having at least a spherical surface facing each of said longitudinal guideways provided in said respective one chamber into which it extends;
a plurality of planar roller bearing assemblies having an overall rectangular shape, each planar roller bearing of said plurality of roller bearing assemblies having a first bearing surface rollingly engaged with a respective one of said longitudinal guideways and an opposite bearing surface; and
a plurality of movable races, one associated with a respective one of said plurality of planar roller bearing assemblies, each movable race of said plurality of movable races having a first substantially flat surface, and a second surface opposing said first surface, said first flat surface rollingly engaging said opposite surface of said respective planar roller bearings of said one planar roller bearing assembly and having a length substantially greater than the length of said rectangular planar roller bearing assembly, said second surface including an extending partially cylindrical trunnion seat engaging said spherical surface of said trunnion which faces said longitudinal guideway engaged by said planar roller bearing such that longitudinal movement of said trunnion generates longitudinal movement of said movable race, and a transverse stop abutment disposed at each end of said movable race, each said movable race first flat surface having a desired longitudinal length and being continuous between said transverse stops to provide substantial movement of said movable race and said respective planar roller bearing assembly with respect to one another between said transverse stops such that when an angle between said inner and outer joint members is less than a predetermined angle, said planar roller bearing assembly will not be engaged by said stop abutment as said races reciprocate with the rotation of the universal joint, and said transverse stop abutments extending from said first flat surface towards said longitudinal guideway and limiting the longitudinal displacement of said respective one roller bearing assembly relative to each said movable race.

2. The universal joint of claim 1 wherein said trunnion seat is a transverse concave cylindrical surface having a radius of curvature corresponding to the radius of said spherical surface of said trunnion.

3. The universal joint of claim 1 wherein said longitudinal guideways are recessed into said pair of spatially separated longitudinal walls of said at least three chambers, and wherein said plurality of planar roller bearings are received in said recessed longitudinal guideways.

4. The universal joint of claim 3 wherein said transverse stop abutments extend from said flat surface into said recessed longitudinal guideways.

5. The universal joint of claim 1 wherein each said planar roller bearing has a predetermined length, said transverse stop abutments are separated from each other by a distance greater than said predetermined length to permit independent longitudinal displacement of each said planar roller bearing between said transverse stop abutments.

6. In a triplan universal joint having an outer joint member having three longitudinal chambers equally spaced about an outer joint member axis of rotation, each of said three longitudinal chambers having a pair of opposing side walls, and each side wall of said pair of side walls having a flat guideway provided therein, an inner joint member having three radially extending trunnions equally spaced about an inner joint member axis of rotation, each trunnion of said three radially extending trunnions extending into a respective one of said three longitudinal chambers between said flat guideways, each trunnion having a spherical surface facing each of said flat guideways provided in said longitudinal chamber into which it extends, and a plurality of planar roller bearing assemblies having an overall rectangular shape, each planar roller bearing of said plurality of roller bearing assemblies having a first bearing face rollingly engaging a respective one of said flat guideways, the improvement comprising:

a plurality of movable races, each movable race of said plurality of movable races having a first flat surface and a second surface opposing said first surface, said first surface engaging a second bearing surface of each said planar roller bearings on the side opposite said first bearing surface and having a length substantially greater than the length of said rectangular planar roller bearing assembly, said second surface including an extending partially cylindrical trunnion seat engaging said spherical surface of each said trunnion facing said flat guideways such that longitudinal movement of said trunnion generates longitudinal movement of said movable race, and a transverse stop abutment provided at each end of each said movable race, each said movable race first flat surface having a desired longitudinal length and being continuous between said stops to provide substantial movement of said movable race and said respective planar roller bearing assembly with respect to one another between said transverse stops such that when an angle between said inner and outer joint members is less than a predetermined angle, said planar roller bearing assembly will not be engaged by said stop abutment as said races reciprocate with the rotation of the universal joint, and said transverse stop abutments extend from said flat surface toward said flat guideway to limit the longitudinal movement of each said planar roller bearing relative to each said movable race.

7. The improvement of claim 6 wherein said trunnion seat is a transverse concave cylindrical surface having a radius of curvature approximately equal to the radius of said spherical surface of said trunnion.

8. The improvement of claim 6 wherein said flat guideways are recessed into said pair of opposing side walls of said at least three longitudinal chambers and wherein said plurality of planar roller bearings are received in said recessed flat guideways.

9. The improvement of claim 8 wherein said transverse stop abutments extend from said flat surface of each said movable race into said recessed flat guideway to guide said movable race along said recessed flat guideway.

10. The improvement of claim 9 wherein each said planar roller bearing has a predetermined length, said transverse stop abutments are separated from each other by a distance greater than said predetermined length to permit independent longitudinal displacement of each said planar roller bearing between said transverse stop abutments.

* * * * *